UNITED STATES PATENT OFFICE.

CHARLES F. MABERY, OF CLEVELAND, OHIO.

METHOD OF TREATING PULP, WOOD, &c., AND THE RESULTING MATERIAL.

No. 832,799.

Specification of Letters Patent.

Patented Oct. 9, 1906.

Application filed July 25, 1903. Serial No. 166,981.

*To all whom it may concern:*

Be it known that I, CHARLES F. MABERY, a citizen of the United States of America, residing at Cleveland, in the county of Cuyahoga and State of Ohio, have invented certain new and useful Improvements in Methods of Treating Pulp, Wood, and other Materials and the Resulting Material, of which the following is a specification.

It is well known that articles made from wood-pulp, strawboard, or similar non-coherent materials are so porous and have such slight strength of coherence that they are of very little use for holding solids or liquids and do not serve any useful purpose where strength is required.

I am aware that processes are in use for impregnating and coating the surface of wood-pulp with certain oils and baking the articles after this treatment at very high temperatures in order to produce a surface resistant to the action of water.

The object of the invention herein described is to convert such porous fragile materials into stronger, denser, and less porous forms and to make their structure more coherent, so that the texture of the body shall be converted into a form more nearly like the structure of the original material from which it is made and at the same time rendering the surface impervious to oils and liquids.

In carrying out my invention I saturate the porous material to a suitable extent, determined as to degree of strength and firmness of structure desired, with a natural vegetable oil or similar material which approaches in its properties the constituents of the original tree or shrub or stalk from which the material is prepared. The saturating substance may be conveniently applied by brushing it on the surface, whereby it is readily absorbed by reason of porosity, or the porous base may be dipped into a saturating-bath. The absorption of the oily mixture may be assisted by the use of volatile solvents—as, for instance, benzin or benzene, acetone, carbon bisulfid, or turpentine mixed with gum-caoutchouc. A saturation in this vegetable oil greatly strengthens and condenses the texture of the material of the base and prepares it for the second step in the process—namely, the application of a substance to make the material insoluble in vegetable oils or water.

The second step in the process consists in applying to the surface of the material after the treatment above described a coating which is prepared by combining a derivative of a vegetable oil with a binder and a solvent. This coating may be applied either by brush or by immersion. After the article is treated with this coating solution it is dried or baked, producing a hard and glossy surface.

The gums which it is necessary to use in the second step of the process in order to accomplish the desired results are very expensive, and if enough were used to saturate the entire mass of the article being treated the process would be too expensive for practical use; but by carrying out the invention in the manner herein described the primary saturation with a cheap vegetable oil extends into the article and prevents more than a surface absorption of the expensive materials of the second step. In other words, the texture of the entire mass of the article is strengthened and condensed by the saturation in the first step of the process. After the first saturation it is preferable to allow the article to dry out, which can be done either in the air or aided somewhat by heat.

By experimentation I have found that if my invention is carried out with the materials and in the manner indicated below particularly good results are obtained at low cost.

I provide a bath of resin-oil, using, preferably, rosin-oil. This is heated to a temperature of from 80° to 100° centigrade. The article to be waterproofed is immersed in this bath until it is sufficiently saturated, after which it is removed and transferred to the second or coating bath, which is prepared in the following manner: A vegetable gum, such as copal gum, is disintegrated by the means of heat until a viscous residue is left. To this residue I add a binder, preferably in the nature of a drying-oil, and a solvent which preferably is obtained by condensing vapor which is driven off during the disintegration of the vegetable gum, into this bath, which is kept at an approximate temperature of 100° centigrade. The article is immersed for a sufficient time to allow the solution to penetrate slightly, when it is removed and baked or dried out for a proper length of time until the coating is hardened.

I claim as my invention—

1. The herein-described process for treating pulp, wood and analogous substances for the purpose of waterproofing and making the same tough and impervious which consists in saturating said articles first with a rosin-oil and subsequently with a bath composed of a vegetable-gum derivative, a binder and a solvent, and finally baking the articles.

2. The herein-described process for treating pulp, wood and analogous substances for the purpose of waterproofing and making them tough and impervious which consists in saturating said articles first in rosin-oil and subsequently in a solution composed of a copal-gum derivative, a drying-oil and a solvent.

3. The herein-described material consisting of pulp, wood or analogous substance which has been toughened or rendered impervious by being saturated first with a rosin-oil and subsequently with a solution composed of a vegetable-gum derivative, a binder and a solvent.

In testimony whereof I affix my signature, in presence of two witnesses, at Portland, Cumberland county, State of Maine.

CHARLES F. MABERY.

Witnesses:
HENRY W. SWASEY,
ANNIE H. BECKETT.